United States Patent [19]

Fabian

[11] Patent Number: 5,202,911
[45] Date of Patent: * Apr. 13, 1993

[54] MARKERS FOR DENTAL X-RAY FILM AND PACKETS FOR SIMPLIFIED FILM MOUNTING

[76] Inventor: Carl E. Fabian, 577 NE. 96th St., Miami Shores, Fla. 33138

[*] Notice: The portion of the term of this patent subsequent to Nov. 24, 2009 has been disclaimed.

[21] Appl. No.: 833,059

[22] Filed: Feb. 10, 1992

Related U.S. Application Data

[63] Continuation-in-part of Ser. No. 665,096, Mar. 6, 1991, which is a continuation-in-part of Ser. No. 572,264, Aug. 27, 1990, abandoned.

[51] Int. Cl.⁵ .............................................. G03B 42/02
[52] U.S. Cl. .................................. 378/168; 378/163; 378/175
[58] Field of Search .......................... 378/168, 163, 175

[56] References Cited

U.S. PATENT DOCUMENTS 2,103,961 12/1937 Wilmanns ............................ 378/185

FOREIGN PATENT DOCUMENTS

0592218 7/1925 France ................................ 378/168

Primary Examiner—Constantine Hannaher
Assistant Examiner—Don Wong
Attorney, Agent, or Firm—Ernest D. Buff

[57] ABSTRACT

A radiographic film packet is adapted to be placed in a patient's mouth for exposing a sheet of dental film to x-rays generated by an x-ray tube. The packet comprises: a light-proof envelope having a first side and second side defining a pocket for receiving the film sheet; a sheet of lead disposed within the pocket adjacent the second side; a sheet of film disposed within the pocket between the lead sheet and the first side; an indicator affixed to the first side of the envelope, the indicator expressly designated the edge of the film packet appointed to be uppermost in the mouth during radiographic exposure; and a marker comprising a perforation in the periphery of the film sheet.

15 Claims, 7 Drawing Sheets

FIG. 7

MARKERS FOR DENTAL X-RAY FILM AND PACKETS FOR SIMPLIFIED FILM MOUNTING

CROSS-REFERENCE TO RELATED APPLICATIONS

This application is a continuation-in-part of copending U.S. application Ser. No. 665,096, filed Mar. 6, 1991 which, in turn, is a continuation-in-part of application Ser. No. 572,264, filed Aug. 27,1990 abandoned.

BACKGROUND OF THE INVENTION

1. Field of the Invention

The present invention relates to the field of dental radiography; and more particularly to means for establishing a constant exposure orientation, and positively identifying viewing orientation of dental film and copies made thereof.

2. Description of the Prior Art

A dental radiograph is an x-ray image of one or more teeth and surrounding bone that is achieved by placing an x-ray film, enclosed in a light-proof package, into the mouth, on one side of a dental structure, while an x-ray tube is aimed at the film from the other side of the structure, generally from outside the face. After the film is developed, it is customarily mounted in a frame of cardboard or plastic for viewing and storage. The mounting of dental radiographs for viewing can be a complex process and has been likened to solving a jigsaw puzzle, requiring a working knowledge of dental anatomy and facial osteology. Since adjacent teeth, opposing teeth, and teeth in the opposite side of the mouth may all appear similar to one another and since the mounting is often performed by technical personnel of varying degrees of training and experience, errors inevitably occur. If an error is made and escapes detection it can lead to treatment of the wrong tooth.

The film is conventionally provided with a "button" along one edge. This button consists of a depression created in one surface of the film and a corresponding raised bump in the opposite surface. The raised side normally corresponds to the side of the film that faced the x-ray tube during exposure. Because of its large size relative to the structures being imaged, this button can cause unacceptable distortion of the underlying image. It is therefore recommended in the literature, as in "Dental Radiology" by Wuehrmann et al., that the button be positioned toward the occlusal plane so as not to superimpose on important dental structures.

While the button is intended to identify the exposure side of the film, it has several disadvantages. First, the button measures approximately 2 mm in diameter and over 3 square millimeters in area, and its curved surface results in distortion of the underlying image. It is therefore positioned close to the edge of the film to prevent it from superimposing on important structures, and it is thus frequently not visible on the mounted film, being partially or completely covered by the mounting frame. The viewer of the mounted film cannot then readily determine whether the film has been properly mounted without removing the film from the frame. Second, when copies are made of the original radiograph, an increasingly common practice because of the rise in dental consultation and litigation, the button is not consistently visible on such copies. The dentist receiving such copies is deprived of the orientation information provided by the original film and may need to repeat the radiographs if there is a question of incorrect mounting. The film manufacturer normally impresses letters or symbols along one edge of the film for manufacturer's identification but these impressions, like the button, are normally hidden by the mounting frame and are not consistently visible on radiographic copies. Furthermore, there are times when the dentist or his personnel may need to determine whether the film they are viewing is an original or a duplicate, for example when films need to be sent out and they wish to be sure to retain the originals for legal considerations. Despite certain differences discernible on careful scrutiny of the two types of films, confusion sometimes arises in telling one from another. It is desirable for office personnel to be able to easily distinguish one film type from another.

French patent 2,618,917 to Zabiolle discloses a method of engraving an inscription on a plate that is attached to a dental x-ray film during exposure to mark the film with the inscription. Canadian patent 1,249,745 to Tanaka discloses an information bearing sheet for x-ray film made of paper or plastic with identification numbers printed in ink containing lead. The need remains in the art for a method and means capable of modifying x-ray dental film to: (1) establish a constant exposure orientation; and (2) positively identify the viewing orientation of the film and copies made thereof.

SUMMARY OF THE INVENTION

The present invention provides means for (1) establishing a constant exposure orientation; and (2) positively identifying a constant mounting orientation of dental x-ray film and copies made thereof. Such identification simplifies the task of film mounting, saving time and substantially reducing the likelihood of human error.

Generally stated, the invention provides a radiographic film packet adapted to be placed in a patient's mouth for exposing a sheet of dental film to x-rays generated by an x-ray tube, comprising: a light-proof envelope having a first side and second side defining a pocket for receiving the film sheet; a sheet of lead disposed within the pocket adjacent the second side; a sheet of film disposed within the pocket between the lead sheet and the first side; an indicator affixed to the first side of the envelope, the indicator expressly designating the edge of the film packet appointed to be uppermost in the mouth during radiographic exposure; and a marker comprising a perforation in the periphery of the film sheet. The perforation is reproducible on copies of the film sheet. Preferably, the perforation is proximate a predetermined corner of the film sheet and having a constant orientation thereon relative to the indicator, for identifying the orientation of the film sheet during exposure. A first surface of the film is elevated within a first region immediately encircling the perforation, and a second surface of the film is depressed within a second region immediately encircling the perforation, thereby enabling tactile and visual identification of exposure side of the film.

A perforation, even when smaller than the traditional button is more visible than the button when the film is illuminated from behind. Also, the perforation, being smaller, can be located somewhat further from the margin of the film so as to appear within the window of the mounting frame. This allows it to be visible even after films have been placed within the mount, serving as constant verification of accurate mounting orientation. The image of the perforation is transmitted to duplicate films made of the original, and the disposition of this image automatically maintains the same relationship to the dental anatomy portrayed as the perforation does on the original. Therefore the duplicate film will provide the same orientation information as the original without requiring any additional steps to this end. Since the marker image is being transmitted from the original film to a blank duplicate film, the duplicate film need not be aligned with any particular corner with respect to the original, saving time and trouble. The perforation also allows one to readily distinguish between original film and duplicate film, since only the original film will contain the actual perforation. The duplicate film will bear only the image of the perforation, which is physically different and easily distinguished from the perforation itself, thus avoiding possible confusion between different film types.

In use, the invention provides means for establishing a constant exposure orientation. The invention further provides means for positively identifying viewing orientation of dental x-ray film, even when the film being viewed is a copy. The means are user friendly and reduce both the skill level and time required to correctly expose and mount film, thereby reducing the likelihood of error. The orientation of the mounting is readily evident on the original film and on copies made thereof, reducing the need for repeat x-rays and decreasing the chance of erroneous treatments.

In addition, the invention provides an improved process for radiographic exposure of dental film within a film packet. The improvement comprises the steps of (a) designating with an indicator the edge of the film packet appointed to be uppermost in the patient's mouth during the exposure; and (b) marking the film at a location thereon having constant orientation relative to the indicator.

BRIEF DESCRIPTION OF THE DRAWINGS

The invention will be more fully understood and further advantages will become apparent when reference is made to the following detailed description of the preferred embodiment of the invention and the accompanying drawings, in which.

DESCRIPTION OF THE PREFERRED EMBODIMENTS

Figure 1:
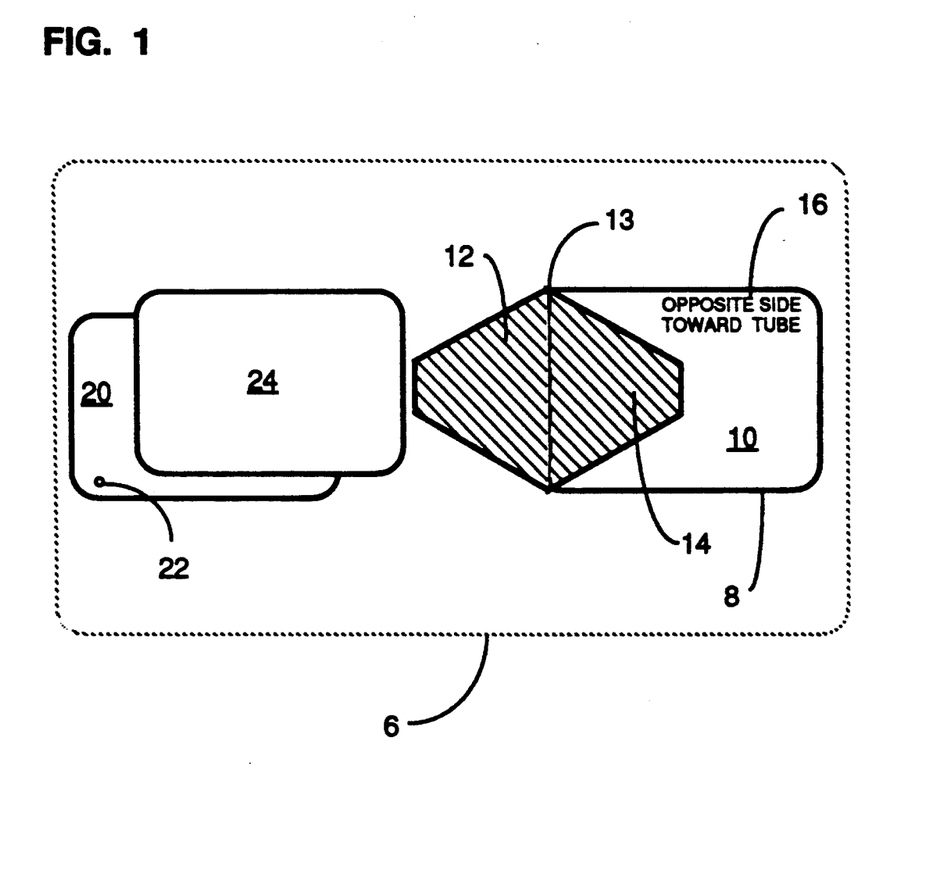
FIG. 1 is a schematic rear side view of the components of a radiographic dental film packet.

Referring to FIG. 1 of the drawings, radiographic dental film packet 6 comprises a light-proof and moisture resistant envelope 8 having a first side (shown at 28 in FIG. 3) and a second side 10 defining a pocket 14 to receive film sheet 20 and lead foil 24. Foil 24 is disposed between the film sheet 20 and second side 10 of envelope 8. Optionally, film sheet 20 is wrapped with black paper to further protect the film sheet from light. Tab 12 folds at line 13 sealing envelope 8. Film sheet 20 is provided with film marker 22 along the periphery of film sheet 20 and proximate a corner. Film marker 22 comprises a perforation in film sheet 20, whereby a copy of developed film sheet 20 will reliably reproduce an image of the marker 22.

Figure 2:
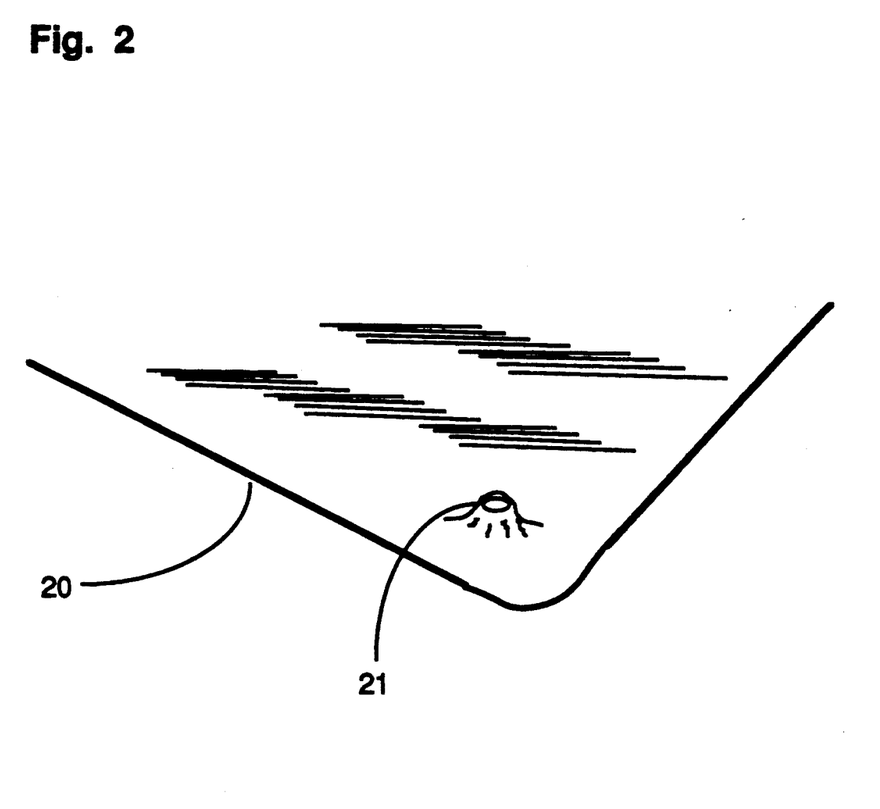
FIG. 2 is a perspective view of a portion of the film sheet that has been provided with perforation having a smooth hole.
Figure 3:
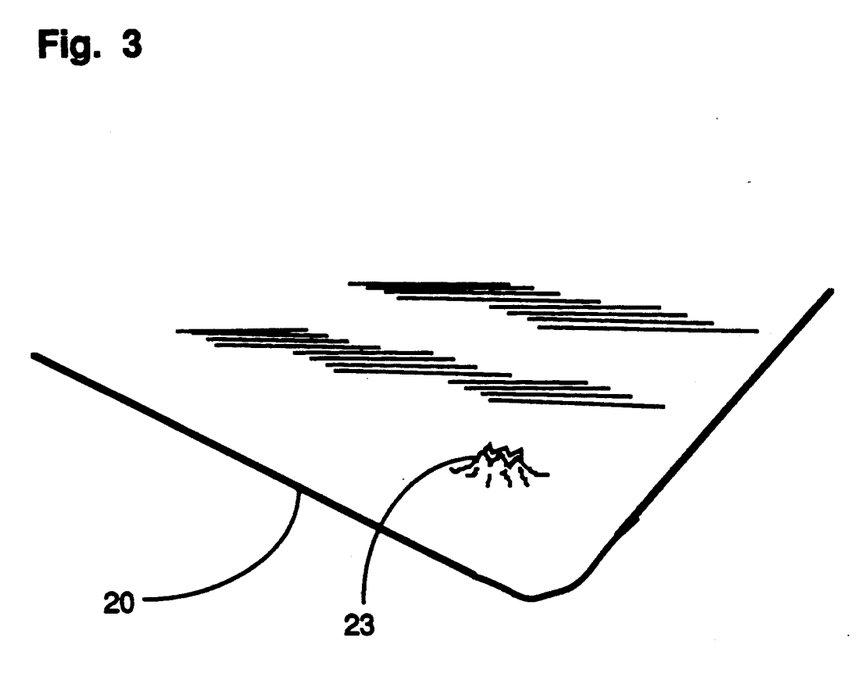
FIG. 3 shows a perspective view of a portion of the film sheet that has been provided with a perforation having a jagged hole.

Preferably, the surface is depressed in a region immediately encircling the perforation on one side of the film sheet, and the surface is elevated in a region immediately encircling the perforation on the other side of the film sheet. Creating the perforation with a sharp point will cause the desired depression and elevation of surface in the region surrounding the perforation hole, thereby providing both tactile and visual identification of exposure side of the film. FIG. 2 shows a perspective view of a portion of film sheet 20 that has been provided with perforation 21 having a smooth hole, and thereby providing both tactile and visual identification of exposure side of film 20. FIG. 3 shows a perspective view of a portion of film sheet 20 that has been provided with perforation 23 having a jagged hole, and thereby providing visual and even greater tactile identification of exposure side of film 20.

Alternatively, the perforation is provided with a non-circular shape, such as a diamond, star, arrowhead, triangle, or square, in order to distinguish between one film type and another. As a further alternative, a plurality of perforations is used in a plurality of dispositions on the film in order to distinguish between one film type and another.

Figure 4:
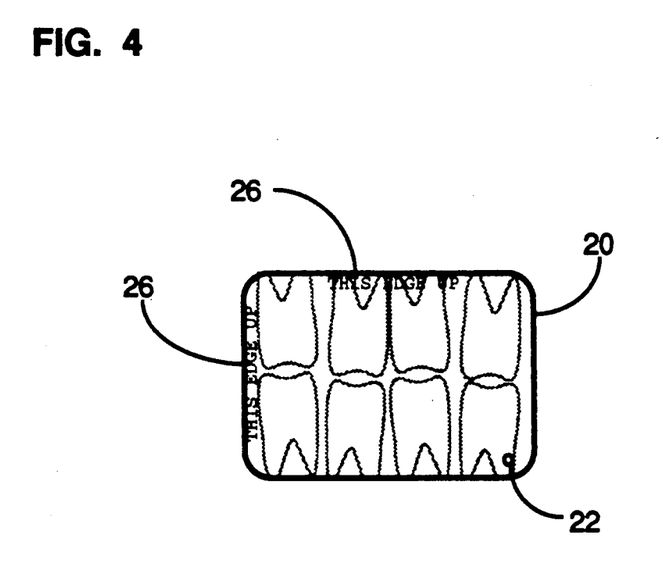
FIG. 4 is a schematic tube side view of a radiographic dental film sheet.

Optionally as shown in FIG. 4, film sheet 20 is provided with additional film marker 26, that specifically labels the upper edge of the film sheet for viewing.

Figure 5:
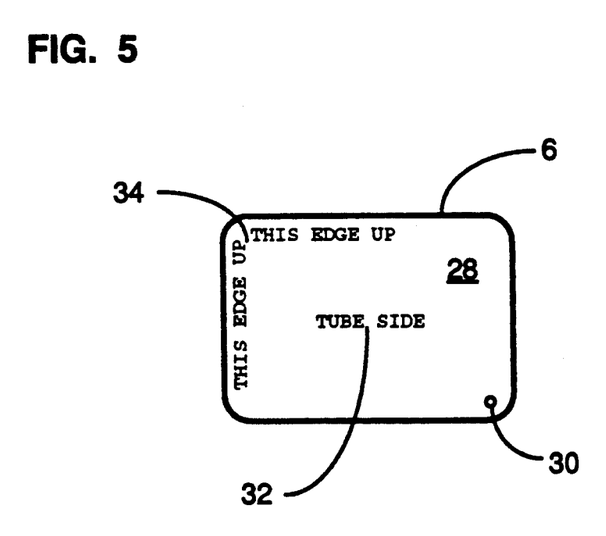
FIG. 5 is a schematic tube side view of a radiographic dental film packet.

Preferably, envelope 8 is rectangular in shape, giving the technologist the option of placing the film in the patient's mouth in either the vertical or horizontal orientation. Referring to FIG. 5 of the drawings, first (or tube) side 28 of envelope 8 is provided with first envelope indicator 34 designating the edge of the packet to be uppermost for vertical or horizontal exposures. Indicator 34 comprises a label, or symbol, thereby giving envelope 8 a visual means of identification. Alternatively, indicator 34 comprises a roughened, scalloped, embossed, dented, or raised edge of the envelope 8, thereby giving envelope 8 tactile means of identification. Optionally, second envelope indicator 32 designates the side of the packet appointed to face the x-ray tube during exposure, and third indicator 30 designates the position of film marker 22 within envelope 8.

Figure 6:
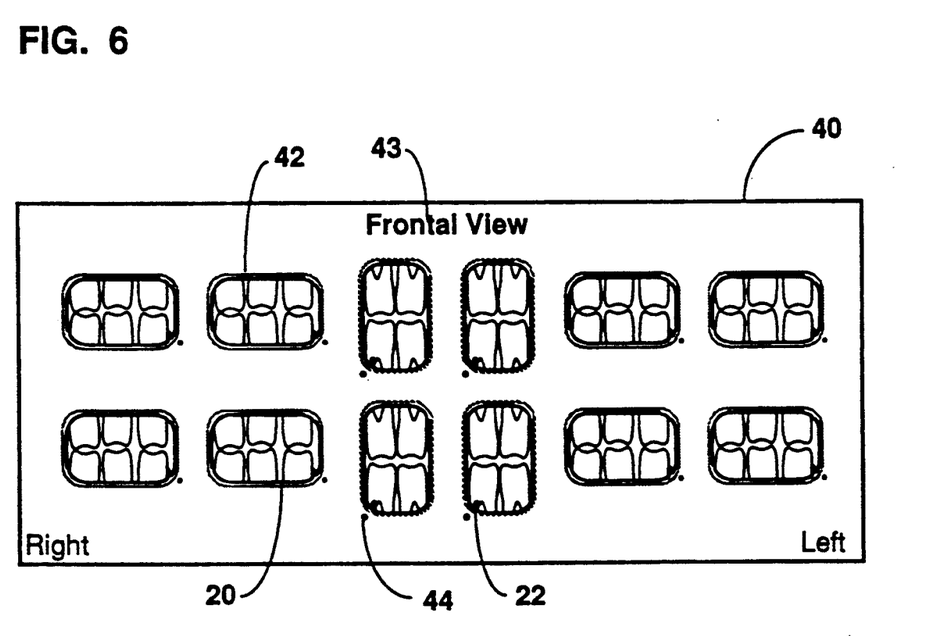
FIG. 6 is a schematic frontal view of developed dental films mounted in a viewing frame.
Figure 7:
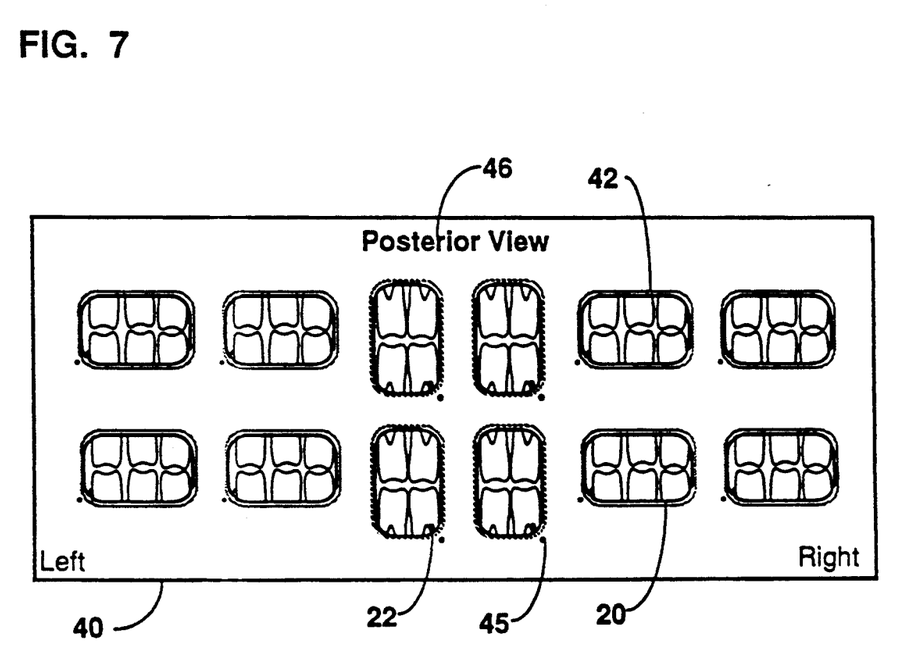
FIG. 7 is a schematic posterior view of developed dental films mounted in a viewing frame.

Preferably, as shown in FIG. 6, film marker 22 is positioned to appear within window 42 of viewing frame 40, so as to not be obscured when mounted therein. FIG. 6 displays the teeth as seen from the front of the patient. Preferably, film marker 22 is at least 1/16 inch from the edge of film sheet 20, thus allowing film marker 22 to be seen when mounted in frame 40. Preferably, viewing frame 40 is provided with labels 43 and 46 indicating the front and back surfaces respectively of frame 40 and labels 44 and 45 designating the corner of window 42 to place film marker 22. A rear or posterior view of viewing frame 40 is shown in FIG. 7. This view displays the teeth as seen from the back of the patient's mouth.

In use, the dental technologist places film packet 6 in the patient's mouth with the tube side 28 facing the X-ray tube, and with one of the first envelope indicators 34 uppermost, depending on whether envelope 8 is oriented vertically or horizontally. After exposure all films are developed and mounted in viewing frame 40, each with film marker 22 oriented in a constant location, in one designated corner for horizontally oriented films and in a second designated corner for all vertically oriented films. Film marker 22 is readily visible and facilitates mounting films within viewing frame 40. When films are properly mounted and viewed from the exposure side, film marker 22 will be in the same corner as it was when the films were exposed, and are disposed in the corner of the frame nearest frame marker 44 (or frame marker 45 when viewed from the reverse side of frame 40).

As an example, an exposed set of 14 Kodak Safety dental films, which the manufacturer marks with both a button and the letters "KS" along an edge, were each modified with a perforation placed a minimum 1/16 inch from the film edge and of diameter varying from ¼ millimeter to 1 mm. A Healthco EZ Mount cardboard frame was modified by marking the front lower right-hand corner of each horizontal window and the front lower left-hand corner of each vertical window with an ink dot. Each film was mounted, with the film perforation in a corner closest to the window dot, in the Healthco EZ Mount cardboard frame. Both the manufacturer's button and identifying letters were obscured by the frame, whereas the perforation was clearly visible on each of the film sheets. When copies were subsequently made of the set, the image of each perforation was clearly seen on all copies, whereas the image of the button was only visible on three of the fourteen and the "KS" was not visible on six of the fourteen.

The essence of the present invention consists of readily identifiable indicator on the exterior of the film packet indicating the exposure orientation of the film which bears a constant relationship in orientation to a marker on the film contained therein. Certain variations in the composition of this marker are possible. In a preferred embodiment, this marker can be a perforation in the film. Furthermore, it is possible to create the perforation in such a way as to produce an elevation on the surface of the film immediately adjacent to the perforation, with a corresponding depression on the reverse side of the film. If the side bearing the elevation is designated to be the exposure side of the film, the exposure side can be identified by touch as well as visually. This can be a desirable feature as it provides another way to identify the exposure side of the film, and one which will already be familiar to personnel experienced in using the button. Although the optimal practical range in size for the perforation is between ¼ mm. and 1 mm., one could envision an application for a very tiny pinhole, about as small as 0.1 mm. in diameter, and likewise there might be other applications in which it would be advantageous to make the perforation nearly as large as the button, up to about 2 mm. in diameter, for example. Furthermore in some applications it may prove advantageous to create the perforation in various shapes, in order to distinguish between one film type and another. Still further, the film sheet may be provided with a plurality of perforations, and such perforations may be disposed on the film sheet in a plurality of patterns or disposed thereon in combination with other types of markers.

Having thus described the invention in rather full detail, it will be understood that such detail need not be strictly adhered to but that further changes and modifications may suggest themselves to one skilled in the art all falling within the scope of the invention as defined by the subjoined claims.

What is claimed is:

1. A radiographic film packet adapted to be placed in a patient's mouth for exposing a sheet of dental film to X-rays generated by an X-ray tube, comprising:

(a) a light-proof envelope having a first side and second side defining a pocket for receiving said film sheet;

(b) a sheet of lead disposed within said pocket adjacent said second side;

(c) a sheet of film disposed within said pocket between said lead sheet and said first side;

(d) an indicator affixed to said first side of said envelope, said indicator expressly designating the edge of said film packet appointed to be uppermost in said mouth during radiographic exposure; and (e) a marker comprising a perforation in the periphery of said film sheet.

2. A radiographic film packet as recited in claim 1, wherein said perforation is reproducible on copies of said film sheet.

3. A radiographic film packet as recited in claim 1, wherein said perforation is proximate a predetermined corner thereof and having a constant orientation thereon relative to said indicator, for identifying the orientation of said film sheet during exposure.

4. A radiographic film packet as recited in claim 1, wherein a first surface of said film is elevated in a first region immediately encircling said perforation, and a second surface of said film is depressed in a second region immediately encircling said perforation, thereby enabling tactile and visual identification of the exposure side of said film.

5. A radiographic film packet as recited in claim 1, wherein said perforation has a shape is selected from the group consisting of diamond, star, arrowhead, triangle, square.

6. A radiographic film packet as recited in claim 1, wherein said perforation is provided with a mean diameter ranging from 1/10 millimeter to 2 millimeter.

7. A market as recited in claim 1, wherein said marker comprises a plurality of said perforations.

8. A radiographic film packet as recited in claim 1, wherein said film sheet further includes a second marker that identifies the upper edge of said film sheet thereby assuring proper orientation of said sheet during viewing.

9. A marker as recited in claim 1, wherein said marker is reproducible upon duplicating said film sheet.

10. A method for forming a perforation hole in a sheet of film having an exposure side, comprising the steps of: perforating a first surface of said film sheet to produce therein a perforation hole having an elevation within a first region, on a first surface of said film sheet, immediately encircling said perforation hole and a depression within a second region, on a second surface of said film sheet, immediately encircling said perforation hole, said elevation and depression enabling tactile and visual identification of the exposure side of said film;

wherein said film sheet is associated with a radiographic film packet including a light-proof envelope having a first side and second side defining a pocket and a sheet of lead disposed within said pocket adjacent said second side, said film sheet being disposed within said pocket between said lead sheet and said first side, and said method further comprises the step of marking said envelope with an indicator designating the edge of said film packet appointed to be uppermost during radiographic exposure from an x-ray tube.

11. A method as recited by claim 10 further including the step of marking said film sheet with a second marker that identifies the upper edge thereof, thereby assuring proper orientation of said sheet during viewing.

12. A method as recited by claim 10, further comprising the step of marking said envelope with a second indicator designating the side of said packet appointed to face said X-ray tube during said radiographic exposure.

13. A method as recited by claim 10, further comprising the step of marking said envelope with a third indicator designating the location of said film marker within said envelope.

14. A method as recited by claim 10, further including the step of forming said perforation into a shape selected from the group consisting of diamond, star, arrowhead, triangle and square.

15. A method as recited by claim 10, further including the step of perforating said first surface a plurality of times to produce therein a plurality of perforation holes collectively forming said film marker.

* * * * *